W. O'LEARY.
CLOCK.
APPLICATION FILED APR. 15, 1922.
Reissued July 4, 1922. 15,398.
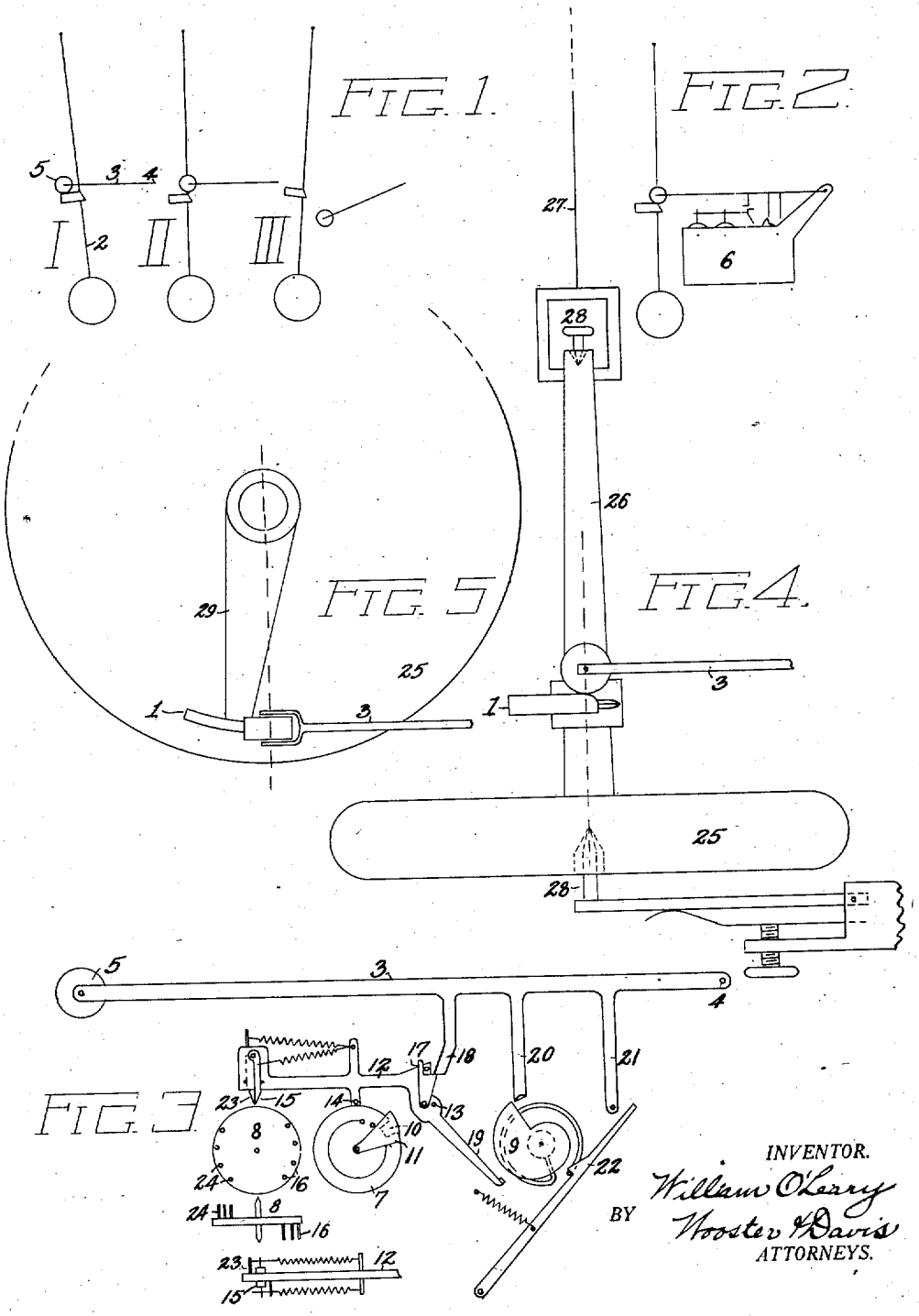
INVENTOR.
William O'Leary
BY Wooster & Davis
ATTORNEYS.

UNITED STATES PATENT OFFICE.

WILLIAM O'LEARY, OF BELVEDERE COLLEGE, DUBLIN, IRELAND.

CLOCK.

15,398. Specification of Reissued Letters Patent. Reissued July 4, 1922.

Original No. 1,365,537, dated January 11, 1921, Serial No. 276,149, filed February 10, 1919. Application for reissue filed April 15, 1922. Serial No. 553,220.

*To all whom it may concern:*

Be it known that I, WILLIAM O'LEARY, a citizen of the Irish Free State, residing at Belvedere College, Dublin, Ireland, have invented a new and useful Clock, of which the following is a specification.

My clock is of the known type in which an impulse is timed and given to the pendulum periodically, for example every minute, by means of a roller at the end of a pivoted lever falling on a pallet fixed to the pendulum.

In order that from the outset my invention may be clearly understood I show the principal phases in the operation of this principle in Figure 1 of the accompanying drawings.

A pallet 1 is fixed transversely on the pendulum 2. An impulse lever 3 pivoted at 4 has a roller 5 which falls nominally every minute on the pallet, just a little before the pendulum reaches its median or exact minute position. In position I the impulse lever has just been released. In transition from position I to II the roller merely rolls on the pallet. In position II the edge of the pallet has reached the roller, and this latter will roll down along it, thus giving an impulse to the pendulum. In position III the roller has fallen free of the pendulum, and it will be reset for the next impulse.

My clock is also of known type inasmuch as it embodies a device for letting fall and resetting the impulse lever. And it is also of known type inasmuch as it embodies an auxiliary timing clock for correctly timing the release of the impulse lever.

But whereas other timing clocks are kept synchronous with the pendulum by elaborate mechanism operating on their going rate, I neglect all correction of the going rate of my timing clock, and substitute a much simpler method of timing. And whereas timed impulses of the kind I have described have so far been applied only to pendulums I apply them also to balance wheels.

To keep my description clear I refer at first only to the combination with a pendulum, and I shall suppose that the pendulum beats seconds and that the impulse is to be given every minute, though in practice any convenient period may be chosen.

The principle of my timing device is the following: Though an ordinary timepiece may have an error of several seconds in a few hours, its error in a short run like $59\frac{3}{4}$ seconds, though it may vary, will always remain very small. And hence if a device for releasing the impulse lever be constructed in such a way that it starts from a standard starting or initial position at the exact minute, and is carried forward by the movement of such a clock to a releasing position in $59\frac{3}{4}$ seconds, then every run starting from the initial position at an exact minute will find the device in the releasing position $\frac{1}{4}$ second before the next exact minute, within a very small margin of error. The error of the timepiece may be cumulative, but that of the correctly started release is not.

To apply and carry out my principle, my release device may be of any convenient form. I run this device by suitably arranging and connecting it with an ordinary timepiece or other suitable timing and driving device. I construct and arrange the release device in such a way that it starts from the standard starting or initial position at the moment of an impulse, and arrives at the releasing position a determined convenient fraction of a second before the next impulse period. The impulse lever is released, the impulse given, and the impulse lever reset as hereinbefore described. At this impulse the release device is restarted from initial position and times the next impulse as before.

To substantially carry out my principle it is clear that the release device need not necessarily be brought to the starting position at the impulse moment, it might be trued, for example, at the resetting of the impulse lever, or at any other convenient moment, provided it is definitely fixed and closely determined by the impulse moment.

Nor is it strictly necessary, though it may be advisable, that the release device should be started true from the starting or initial position at each and every impulse. It might be trued only when the error in the run had reached a certain magnitude.

In order that my said invention may be understood I append hereunto one sheet of drawings.

Fig. 1 illustrates the known impulse device hereinbefore described.

Fig. 2 shows the arrangement of my timing and impulse device with a pendulum.

Fig. 3 shows the construction and arrangement of my timing clock and impulse device in elevation, and the parts 8 and 12 in plan.

Fig. 4 shows the construction and arrangement of a balance wheel with my timing clock in elevation.

Fig. 5 shows the same in plan.

*The timing clock.*

My timing principle is clearly capable of being put into operation in many ways. I prefer the following construction. It is in general features a clock of ordinary design. I make this clock go fast by a convenient fraction of a second per minute, for example ¼ second, so as to release the impulse lever in good time. At the moment of release I stop both clock and release, and restart them from this release position at the impulse. Thus I always start from the standard position, and make each run independent of any time error of the last. The timing clock is thus brought up to time and indicates correct time at each impulse.

Fig. 3: For the purpose of my invention I refer to two wheels only of the clock, 7 a plain wheel fixed on the axle of the seconds wheel, and therefore revolving nominally in a minute, and 8 the balance wheel. The cam 9, actuated by a separate train of wheels, performs the resetting operation. The wheel 7 has a slot 10 cut in its rim. A springed pawl 11, traveling with the wheel, ordinarily covers the slot and projects a little higher than the rim. A lever 12 pivoted at 13 has a flat transverse pin 14 which rides with the weight of the lever on the rim of 7. Pivoted at the end of 12 are light springed pawls 15 and 23 with freedom in opposite directions and arranged so as to bestride the balance wheel 8 beneath. From the rim of 8 project at suitable positions transverse pins 16 and 24. A springed detent 17 ordinarily supports 3 as shown. The cam 9 operates on the cranks 19 and 20.

For clearness I describe first how my timing clock operates in the known pendulum arrangement. The balance wheel arrangement will then be clearly understood. The timing clock having been regulated to go fast by a convenient fraction of a second per minute is started. 7 moves around until the projecting edge of 11 meets the pin 14. 11 is pressed back until the slot 10 moves under the pin. Then 12 falls, and 15 engages one of the pins 16 in the balance wheel, thus stopping the timing clock. (I refer later to the use of the double sets of pawls and pins.) At the same time 17 has fallen from under 18, and 3 has been released. I shall suppose that the pendulum has meanwhile been held in position I Fig. 1, so that 5 as now fallen on 1. At the proper time the pendulum is let fall, so that it may reach position II Fig. 1 at the exact minute, and it receives the impulse in the manner hereinbefore described. 3 then falls free of the pendulum, and the crank 21 strikes 22, releasing the cam 9, which rapidly revolves, striking the crank 19, which resets 12, thus raising 14 from the slot, and 15 from the balance wheel, and resetting the detent 17, and the timing clock restarts. Also the cam 9 through the crank 20 raises 3 a little in retard of the resetting of 12, so that 18 flicks the detent 17 and is safely reset. Everything is now reset, and the timing clock has started timing the next impulse.

*Notes on details.*

The cranks on the impulse lever are so designed that they make no contacts with other parts during the period from the release of the lever until it falls free of the pendulum. This is a known method of securing a simple gravity impulse. The object of the covering pawl 11 is to prevent 14 falling back into the slot when 12 is reset.

The pins 16 are placed in such a position that on release the balance wheel will have a good reliable starting swing.

If the balance wheel is moving clockwise on the fall of 12 either the pins 16 clutch 15 or the pins 24 flick past 23 and clutch on the return. Conversely if the movement is anticlockwise. The arrangement of one pawl and one pin only will work, but 14 then requires careful adjustment. By using double pawls and several pins I give a good margin for irregularity in the amplitude of the swing of the balance wheel, pick up a more favorable position, and prevent undue shock to the bearings of the wheel.

As far as I know timing clocks have hitherto been synchronized pendulum clocks, and consequently were not applicable to seagoing balance wheel clocks. But my timing clock may be a balance wheel clock, and therefore I apply it not only to timing impulses to pendulums, but also in a similar manner to balance wheels. And furthermore, as far as I know, I am the first to use any timing device for timing such impulses to balance wheels, and therefore I now claim the use of any convenient timing device for this purpose. Such a device might be a light counting wheel moved by the oscillation of the balance wheel, and thus timing impulses as in some older pendulum models.

I construct and arrange a balance wheel in combination with my timing clock as hereunder.

I use any convenient design of my timing clock hereinbefore described. Fig. 4 shows in elevation, and Fig. 5 in plan the construction and arrangement of the balance wheel and impulse lever.

25 is the balance wheel on its shaft 26. Any suitable mounting, as frictionless as possible, may be used. For instance 26 is suspended vertically from a thin steel wire 27. Needle centers 28, 28, with vertical freedom only, engage the cups in the shaft 26 with only the pressure suitable to keep the wheel running true. This can be done either by adjustable springed lever or in any suitable way. A crank 29 on the shaft carries the impulse pallet 1. 3 is the impulse lever with its roller. The timing clock and release devices are not shown, as they have been fully described. The hair spring of the balance wheel is suitably arranged. Any suitable period may be chosen for balance wheel and impulse. I preferably make my balance wheel rather heavy to give it weight and momentum comparable to those of pendulums similarly used.

The method of operation needs no description as it is plainly similar to the case of the pendulum hereinbefore described.

In order to minimize shock to the bearings of the balance wheel when at sea it may be advisable to make the suspension point of the gimbal suspension system coincide with the upper point of suspension of the wire 27, and to make the free period of the timing clock and mountings about the gimbal suspension the same as that of the balance wheel about a horizontal axis through its upper point of suspension.

I claim—

1. In a clock having an oscillating member and a device for imparting periodic impulses to said oscillating member, in combination, an independent timing mechanism, a release device controlled by said timing mechanism for controlling the periodic functioning of the said impulse device, and means controlled by the oscillating member for starting the said release device from a standard position at the beginning of each impulse period.

2. In a clock having an oscillating member and a device for imparting periodic impulses to said oscillating member, in combination, an independent timing mechanism for controlling the periodic functioning of the said impulse device, and means controlled by the oscillating member for starting the said timing mechanism from a standard position at the beginning of each impulse period.

3. In a clock having an oscillating member, and a device for imparting periodic pulses to said oscillating member, in combination, an independent timing mechanism, a release device for releasing the impulse device at periodic intervals, said release device being controlled by the said timing mechanism and regulated to run ahead of the oscillating member during each impulse period, and means controlled by the oscillating member for starting the release device from a standard starting position at the beginning of each impulse period.

4. In a clock having an oscillating member and a device for imparting periodic impulses to said oscillating member, in combination, a release device for controlling the periodic functioning of the impulse device, means for placing the release device ahead of the oscillating member at the end of each impulse period, and means controlled by the oscillating member for starting the said release device from a standard position at the beginning of each impulse period.

5. In a clock having an oscillating member and a device for imparting periodic impulses to said oscillating member, in combination, an independent timing mechanism, a release device for controlling the periodic functioning of the impulse device, means controlled by the timing mechanism for placing the release device ahead of the oscillating member at the end of each impulse period, and means controlled by the oscillating member for starting the said release device from a standard position at the beginning of each impulse period.

6. In a clock having an oscillating member and a device for imparting periodic impulses to said oscillating member, in combination, an independent timing mechanism for controlling the periodic functioning of said impulse device, and means controlled by the oscillating member for eliminating the error in the timing mechanism at the beginning of each impulse period.

7. In a clock having an oscillating member and a device for imparting periodic impulses to said oscillating member, in combination, an independent timing mechanism for controlling the periodic functioning of the impulse device and regulated to run ahead of the oscillating member during each impulse period, and means controlled by the oscillating member for eliminating the error in the timing mechanism at the beginning of each impulse period.

8. In a clock having an oscillating member and a device for imparting periodic impulses to said oscillating member, in combination, an independent timing mechanism, a release device controlled by said timing mechanism for controlling the periodic functioning of the said impulse device, and means controlled by the oscillating member for starting the said release device and said timing mechanism from standard positions at the beginning of each impulse period.

9. In a clock having an oscillating member and a device for imparting periodic impulses to said oscillating member, in combination, an independent timing mechanism, a release device controlled by said timing mechanism for controlling the periodic functioning of the said impulse device, and means controlled by the oscillating member for starting the said release device from a standard position and eliminating the error in the timing mechanism at the beginning of each impulse period.

10. In a clock having an oscillating member and a device for imparting periodic impulses to said oscillating member, in combination, an independent timing mechanism regulated to run ahead of the oscillating member during each impulse period, a release device controlled by said timing mechanism for controlling the periodic functioning of the said impulse device, and means controlled by the oscillating member for starting the said release device from a standard position and eliminating the error in the timing mechanism at the beginning of each impulse period.

11. In a clock having an oscillating member and a device for imparting periodic impulses to said oscillating member, in combination, an independent timing mechanism for controlling the periodic functioning of the impulse device and regulated to run ahead of the oscillating member during each impulse period, said timing mechanism including a rotating wheel, a lever normally maintained in elevated position by said wheel and arranged to normally maintain the impulse device in ineffective position, means associated with said wheel for permittting the lever to drop at predetermined intervals to allow the impulse device to function to impart an impulse to said oscillating member, means controlled by the dropping of the lever for stopping the timing mechanism, and means controlled by the oscillating member for resetting the lever and allowing the timing mechanism to start at the beginning of each impulse period.

12. In a clock having an oscillating member provided with a pallet having an inclined surface, a device for imparting periodic impulses to said member comprising a pivoted lever having a roller to coact with said inclined surface, an independent clock mechanism including an oscillating member provided with one or more stops and a rotating recessed disc, a pivoted lever having a shoulder resting on the rim of the disc and adapted to enter the recess, stop means controlled by said lever for engaging the stops to stop the timing clock when the shoulder enters the recess, means operated by the second lever for controlling the release of the impulse lever, and means controlled by the impulse lever for resetting the impulse and second levers and allowing the independent timing clock to start at the beginning of each impulse period.

13. An automatic regulating mechanism for clocks, comprising in combination with an oscillating member of a time piece, a device for imparting periodic impulses to said oscillating member, an independent time mechanism, and devices for releasing and resetting the said impulse device at predetermined periods by the said independent clock mechanism.

14. An automatic regulating mechanism for clocks, comprising in combination with an oscillating member of a time piece, a stop member associated with the said oscillating member, a device for coacting with the said stop to impart an impulse to the same and the oscillating member, an independent clock mechanism, means for releasing the said device at predetermined periods to enable the same to coact with the said stop and impart thereto an impulse at a predetermined time, and means for resetting the said device immediately upon the same having acted to impart an impulse to the said stop and oscillating member.

15. An automatic regulating mechanism for clocks comprising in combination with a pendulum, a stop on the said pendulum having an inclined end, a lever pivotally mounted at one end and adapted at its opposite end to contact with the said stop and roll off the inclined end thereof to impart an impulse to the pendulum, an independent clock mechanism, and devices actuated thereby for setting and releasing the said lever at predetermined periods.

16. An automatic regulating mechanism for clocks comprising in combination with a pendulum, a stop on the said pendulum having an inclined end, a lever pivotally mounted at one end and adapted at its opposite end to contact with the said stop and roll off the inclined end thereof to impart an impulse to the pendulum, an independent clock mechanism, an auxiliary lever, devices operated by the independent clock mechanism for releasing the said auxiliary lever at predetermined intervals, thereby releasing the aforesaid lever, and devices operative when the first aforesaid lever is released for resetting the same and the auxiliary lever whereby impulses are imparted to the said pendulum at predetermined periods.

17. An automatic regulating mechanism for clocks comprising in combination with a pendulum, a stop on the said pendulum having an inclined surface at one end thereof, an impulse lever pivotally mounted at one end, a roller in the other end of the said impulse lever and adapted when the impulse lever is released to strike the said stop and roll over the inclined surface at the end thereof to impart an impulse to the said pendulum, an independent clock mechanism including a second wheel, an auxiliary lever normally maintained in position by the second wheel and adapted to normally maintain the said impulse lever in a set position, means associated with the said second wheel for permitting the auxiliary lever to drop at predetermined intervals to release the impulse lever in order to impart an impulse to the pendulum at said intervals, thereby stopping the independent clock mechanism, and means operative when the said auxiliary lever is permitted to drop for resetting the said auxiliary lever and also the said impulse lever and at the same time permitting the independent clock mechanism to start again.

18. An automatic regulating mechanism for clocks comprising in combination with a pendulum, a stop on the said pendulum having an inclined surface at one end thereof, an impulse lever pivotally mounted at one end, a roller in the other end of the said impulse lever and adapted when the impulse lever is released to strike the said stop and roll over the inclined surface at the end thereof to impart an impulse to the said pendulum, an independent clock mechanism including a second wheel, an auxiliary lever normally maintained in position by the second wheel and adapted to normally maintain the said impulse lever in a set position, means associated with the said second wheel for permitting the auxiliary lever to drop at predetermined intervals to release the impulse lever in order to impart an impulse to the pendulum at said intervals, thereby stopping the independent clock mechanism, a cam device operated by the independent clock mechanism, means for releasing the cam device when the said impulse lever is permitted to drop, and arms associated with the said auxiliary lever and impulse lever and adapted to have the said cam device contact therewith in order to reset the said auxiliary lever and the impulse lever and thereby permit the independent clock mechanism to become operative again.

In testimony whereof I affix my signature.

WILLIAM O'LEARY.